United States Patent Office 3,317,481
Patented May 2, 1967

3,317,481
CHEMICAL COMPOSITIONS AND PROCESS
Mortimer A. Youker, Wilmington, Del., assignor to E. I. du Pont de Nemours and Company, Wilmington, Del., a corporation of Delaware
No Drawing. Filed July 24, 1964, Ser. No. 385,059
6 Claims. (Cl. 260—77.5)

This application is a continuation-in-part of Ser. No. 334,034, to the same inventor, filed Dec. 27, 1963.

This invention relates to novel compositions which are useful for the preparation of highly useful and economical polyurea resins, to methods of preparing these compositions and the polyurea resins therefrom, and to novel products obtained with these compositions and resins.

It is known that most polyisocyanates react with water to produce polyureas. In general, aromatic polyureas, so produced, are high-melting, crystalline solids having relatively low molecular weights. These properties limit the utility of aromatic polyureas. As a result, the majority of successful products derived from aromatic polyisocyanates contain a significant number of urethane linkages formed by reacting the polyisocyanates with glycols and polyols.

It is an object of the present invention to provide novel polyisocyanate compositions which are capable of forming useful and economical aromatic polyurea resins. Another object is to provide methods of preparing the novel compositions and the polyurea resins obtainable therefrom. A further object is to provide tough, insoluble, amorphous polyurea resins which are suitable for a wide variety of applications, such as coating, impregnating, and laminating many different types of substrates. Other objects of the present invention will appear hereinafter.

It has been found that a solution of (a) aromatic polyisocyanate which represents the undistilled product resulting from the phosgenation of an aromatic polyamine in (b) certain solvents for the polyisocyanate, when contacted with water, yields highly useful and economical amorphous polyurea resins. These certain solvents can thus be generally described as solvent which yields amorphous polyurea upon contact of the solution with water. Representative solvents which are suitable for this purpose are as follows: (1) N-alkylated aliphatic amides containing up to 25 carbon atoms; (2) dialkyl sulfoxides containing up to 8 carbon atoms; (3) N-alkylated sulfonamides; (4) tetraalkyl ureas containing up to 25 carbon atoms, and (5) mixtures thereof.

The solvent, component (b), should be present in the amount to obtain the desired result, namely formation of essentially amorphous polyurea from the undistilled aromatic polyisocyanate phosgenation product, component (a). Generally preferred compositions in terms of these components alone are those containing from 0.1 to 10 parts by weight of the selected solvent for each part by weight of the undistilled product.

The invention also includes the process of preparing insoluble amorphous polyurea resins by contacting the above compositions with water; and further, the process of forming polyurea resins in situ, in or on any of a variety of substrates by coating and/or impregnating the substrates with the compositions and subsequently contacting with water.

The compositions of this invention are derived from two major components; namely, an undistilled aromatic polyisocyanate and a selected solvent. Obviously other materials may be present in minor amounts. Larger amounts of diluent can also be present.

The useful aromatic polyisocyanates are undistilled reaction products resulting from the phosgenation of an aromatic polyamine. Such products are useful for the preparation of rigid foams as is known to those skilled in polyurethane art. For purposes of the present invention, the aromatic polyisocyanates should be free of substituents which would interfere with the subsequent formation of polyurea under the conditions employed. It is well known that phosgenation of aromatic polyamines leads to the formation of the corresponding polyisocyanates and essentially non-volatile by-product, in major and minor proportions, respectively. The undistilled phosgenation product used in the present invention includes the non-volatile by-product and varying amounts of the polyisocyanates, with the minimum proportion generally being sufficient to fluidize the non-volatile product and the maximum proportion being a matter of choice according to the desired use of the composition of the present invention. The undistilled phosgenation product can include all the polyisocyanate formed in the phosgenation process and, in addition, minor amounts of refined polyisocyanate.

Phosgenation of polyamines usually involves contacting a solution of a polyamine in an inert solvent with an excess of phosgene. The conversion of the polyamine solution to a polyisocyanate solution can be accomplished in one or more reaction stages. When more than one stage of reaction is employed, subsequent stages are customarily operated at increasing temperatures. Phosgenation can also be carried out by contacting a slurry or suspension of polyamine hydrochloride in an inert solvent with phosgene. Representative processes are disclosed in U.S. Patents 2,822,373; 2,680,127 and 2,908,703. While it is usually desirable to remove essentially all of this solvent, a small residual amount normally does not interfere with the use of the undistilled polyisocyanate in the compositions of the present invention. Lower boiling phosgenation solvents can be employed as a diluent for the compositions of the present invention as will be later explained.

Products produced by removing a part of the volatile polyisocyanate, which is in the usual case the desired product, from a phosgenation mass can also be used in the compositions of the present invention. Generally, the amount of polyisocyanate allowed to remain in the undistilled product should be sufficient to provide a fluid product at normal or slightly elevated temperatures. More viscous materials prepared by removing most of the polyisocyanate contained in the phosgenation product can be used in the compositions of the present invention but are less convenient to handle.

The polyamines which can be phosgenated to provide the undistilled polyisocyanates of use in this invention may be characterized as being aromatic polyamines having on the average at least 2 or more amino groups per molecule. The amino groups should be primary and must be attached directly to a benzene ring or to an aromatic hydrocarbon fused ring system as indicated by the requirement that the polyamine be aromatic. The amino groups can be attached to the same benzene ring, to the same ring of a fused ring system, or they can be attached to different benzene rings or different rings in fused systems contained in more complex compounds. Tolylene diamines and phenylene diamines are preferred representatives of polyamines having amino groups attached to the same benzene ring. Other phenylene diamines substituted with alkyl, aryl, alkoxy and halogen radicals may be also employed. Aromatic triamines such as symmetrical triaminobenzene and 2,4,6-triaminotoluene are representative of polyamines containing more than two amino groups on a single benzene ring.

Of the polyamines containing more than one benzene ring, derivatives of diphenylmethane, triphenylmethane, and biphenyl are especially preferred. Representative examples of such compounds include 4,4'-diaminodiphenylmethane, 3,3' - dimethyl-4,4'-diaminodiphenylmethane, 3,3 - dimethoxy-4,4'-diaminodiphenylmethane, 4,4',4''-triaminotriphenylmethane, benzidine and 3,3'-dimethyl benzidine. Also useful are compounds in which two benzene rings are joined through an ether, thioether or sulfone linkage; for example, 4,4'-diaminodiphenyl ether, 2,4,4'-triaminodiphenyl ether, 4,4'-diaminodiphenyl sulfone and 4,4'-diaminodiphenyl sulfide.

A particularly useful class of polyamines can be prepared by the condensation of formaldehyde with aromatic amines such as aniline and o-toluidine. This is a classical route to diphenylmethane derivatives. Depending on the ratio of amine to formaldehyde and the aromatic amine involved, the amount of diamine formed can be varied within certain limits. The other products produced by this reaction are polyamines containing three or more amino groups. Products of such condensations, after removal of aromatic monoamines, may be phosgenated directly. Such phosgenation products are ideally suited for use in the compositions of the present invention. The undistilled polyisocyanate mixtures disclosed in U.S. Patent 2,683,730 are representative of products of this type. The related polyisocyanates of U.S. Patent 2,097,191 are also useful in this invention. U.S. Patent 2,097,191 discloses that mixtures of amines may be used to advantage in amine-formaldehyde condensation. These mixtures can include diamines, such as m-tolylene diamine, in addition to monoamines.

Less preferred for reasons of economy are di- and polyamines derived from fused ring aromatic hydrocarbons. These are exemplified by compounds such as 1,5-naphthylene diamine, 1,4-naphthylene diamine, 2,5-diaminofluorene and 1,3,5-triamino naphthalene. Derivatives of this type may also be substituted with alkyl, aryl, alkoxy and halogen groups.

Minor amounts of refined polyisocyanates may be used with the undistilled phosgenation products described hereinbefore; however, they add to the cost of the compositions of the present invention and tend to increase the crystallinity of the polyureas which may be derived from the compositions of this invention. This may be strikingly illustrated by comparing the behavior of compositions derived from undistilled and distilled methylene bis(4-phenylisocyanate). When a fresh solution of equal parts by weight of undistilled methylene bis(4-phenylisocyanate) and N,N-dimethylformamide is poured onto a smooth release surface and allowed to stand in air until essentially all the solvent has evaporated, a tough, transparent film is formed. X-ray diffraction studies indicate that the film is essentially amorphous. When these operations are repeated with distilled methylene bis(4-phenylisocyanate), no film is formed. Instead, a powdery solid which appears to be made up of loose aggregates of very small crystals is obtained.

While the essential ingredients toward formation of an amorphous polyurea product from the compositions of the present invention are the undistilled polyisocyanate and selected solvent as defined, a variety of other di- or polyfunctional compounds, which are reactive toward isocyanates, may be added to the undistilled polyisocyanates used in preparing these compositions. In order to maintain the properties provided by the polyureas yielded by the compositions of this invention, the amount of such compounds added should generally not exceed the weight of the polyisocyanate. For the same reason, the amount of such compounds should generally not contain a quantity of active hydrogen sufficient to consume a half or more of the isocyanato groups contained in the polyisocyanate. Thus, the amorphous product is mainly a polyurea. The following are representative of such di- and polyfunctional active hydrogen compounds which may be of use: low molecular weight glycols and polyols such as ethylene glycol, propylene glycol, butanediol-1,4 neopentyl glycol, and 1,2,6-hexanetriol castor oil, glycerin and trimethylolpropane; polymeric glycols and polyols such as (1) polyalkyleneether glycols and polyols which may be derived by condensing ethyene or propylene oxide with low molecular weight glycols, polyols, aminoalcohols and diamines and (2) polyester glycols and polyols prepared from diacids and low molecular weight glycols and polyols by esterification; low molecular weight aliphatic and aromatic di- and polyamines such as ethylene diamine, hexamethylene diamine, diethylene triamine, xylylene diamine, phenylene diamine, tolylene diamine, methylene dianiline, 3,3'-dichloro-4,4'-diaminodiphenylmethane and 2,4,4'-triaminodiphenyl ether.

When active-hydrogen compounds of the types listed above are used, they may be added to and reacted with the polyisocyanate prior to mixing with the solvents used in the present compositions. Alternatively, the active-hydrogen compound can be added to the mixture of polyisocyanate and solvent and allowed to react in the presence of the solvent.

In general, the solvents employed in preparing the compositions of the present invention may be termed as "super-solvents" of the type which have found use in dissolving linear polymers such as polyamides, polyesters, polyacrylonitrile and various linear polyurethanes and linear polyureas. These solvents, which will be classified and described in detail hereinafter, are essentially neutral. Many of the preferred solvents are completely miscible with water, but this is not a requirement. Most of the solvents are at least hygroscopic. The solvents may be solids (at room temperature) which form liquid solutions with the undistilled polyisocyanate. The solvents are inert toward isocyanato groups in that they are free of reactive active hydrogens such as are contained in the usual condensation reactants, amines and alcohols. However, most of them appear to be catalysts for the formation of compounds derived from the polymerization of isocyanato groups; for example, isocyanurates. Some of the solvents will react with isocyanates at elevated temperatures; for example, the alkylated amides form amidines. These reactions are not detrimental as long as the compositions of this invention are not stored for extended periods or heated. In addition, these solvents appear to catalyze the isocyanato-water reaction. This is an advantage in forming the polyureas of this invention.

The solvent portion of the novel compositions of this invention plays an important role in the formation of the resinous polyureas. If solvents other than those specified herein are employed, such as hydrocarbons, esters and ketones, the polyureas produced by contacting with moisture tend to be more crystalline rather than resinous and at best have poor mechanical properties. If solvent is omitted, the polyisocyanates slowly form powdery products when contacted with water.

The types of solvents which are of use in preparing the compositions of this invention include N-alkylated aliphatic amides, ureas, sulfonamides, and sulfoxides.

The N-alkylated aliphatic amides may be represented by the general formula

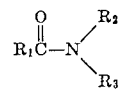

wherein $R_1$, $R_2$ and $R_3$ may be alkyl, cycloalkyl, or arylalkyl, whereby the fully alkylated or N,N-dialkyl aliphatic amides are obtained. $R_1$ may also be hydrogen. $R_1$, $R_2$ and $R_3$ may be independently selected as long as the total number of carbon atoms contained in the three groups does not exceed 24. $R_1$, $R_2$ and $R_3$ may bear substituents which are inert toward isocyanato groups such as halogen and alkoxy. $R_2$ or $R_3$ can be hydrogen whereby the corresponding N-alkyl aliphatic amides will be obtained. $R_2$ and $R_3$ can be alkylene groups and form a ring which may or may not contain a hetero-atom such as sulfur or oxygen. This general formula may also be used to represent an alkylated cyclic amide which would be formed by $R_1$ with either $R_2$ or $R_3$, whereby the amide linkage is part of the cyclic structure. Diamides derived from dicarboxylic acids are contemplated for use since they contain the required alkylated amide structure. Suitable compounds represented by this general formula include N-methyl formamide, N-methyl acetamide, N-butylstearamide, N,N-dimethylformamide, N,N-dimethylacetamide, N,N-di-n-butylformamide, N,N-dimethylcaprylamide, N,N-dimethylstearamide, N-formylpiperidine, N-acetylpyrrolidine, N-formylmorpholine, N,N,N',N'-tetramethyl oxalamide, N,N,N',N'-tetramethyladipamide, pyrrolidone, epsilon-caprolactam, N-methylpyrrolidone and N,N-di-n-butylacetamide. Especially preferred are N,N-dimethylformamide, N,N-dimethylacetamide and N-methylpyrrolidone. For special purposes where a solvent of low volatility is desirable, the N,N-dimethyl amides of higher fatty acids ($C_8$–$C_{18}$) are often preferred.

The fully alkylated ureas are closely related to amides and in a sense may be considered as diamides of carbonic acid. The alkylated ureas may be represented by the general formula

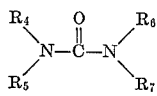

wherein $R_4$, $R_5$, $R_6$ and $R_7$ may be alkyl, cycloalkyl or arylalkyl. The groups may be selected independently as long as the total number of carbon atoms in the four groups does not exceed 24. A preferred urea is N,N,N',N'-tetramethylurea, but many other ureas derived from other secondary amines may be obviously used. Compounds in which $R_4$ forms a ring with $R_5$ and/or in which $R_6$ and $R_7$ form a ring are also contemplated, such as the urea formed from piperidine. Compounds in which $R_4$ or $R_5$ forms a ring with either $R_6$ or $R_7$ may also be used. N,N'-dialkyl substituted ethylene-ureas are representative of ureas having this configuration.

The alkylated sulfonamides can be represented by the general formula

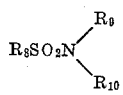

wherein $R_8$, $R_9$ and $R_{10}$ may be independently selected as long as the total number of carbon atoms contained in the three groups does not exceed 25 and wherein $R_8$, $R_9$ and $R_{10}$ may be alkyl, cycloalkyl or arylalkyl. $R_8$ may be also aromatic, $R_9$ or $R_{20}$ may be hydrogen, whereby the N-alkyl sulfonamide is obtained. A mixture of N-ethyl ortho and para toluene sulfonamides is a useful solvent of this class. Such a mixture is the commercially available "Santicizer 8" obtainable from the Monsanto Chemical Co. and contains about equal parts of the ortho and para isomers and minor amounts of unsubstituted sulfonamides. Normally, the $R_{8-10}$ substituents should be selected so that the sulfonamide is a liquid or a low melting solid. Cyclic structures involving $R_9$ and $R_{10}$ are contemplated for the sulfonamides in the same manner disclosed for the carboxylic acid amides and the ureas. Representative sulfonamides include N,N-diethyl ethanesulfonamide, N-butyl neopentylsulfonamide, N,N-dimethyl benzenesulfonamide, N-ethyl-N-methyl benzenesulfonamide, N,N-diethyl toluene-α-sulfonamide, N-ethyl toluene-α-sulfonamide, and N-methyl-N-ethyl p-toluenesulfonamide.

The above-described cyclic amides, viz. alkylated cyclic amides, cyclic ureas, and cyclic sulfonamides are included within the naming of their respective species of solvents.

Alkylated sulfoxides represent another solvent type which is useful in the present invention. The sulfoxides may be represented by the formula

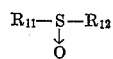

wherein $R_{11}$ and $R_{12}$ may be alkyl, cycloalkyl or arylalkyl, selected so that the total number of carbon atoms contained in $R_{11}$ plus $R_{12}$ is no greater than 8. Cyclic structures formed by $R_{11}$ and $R_{12}$ are also contemplated. Representative of this solvent type are dimethyl sulfoxide, diethyl sulfoxide, and tetramethyl sulfoxide.

The compositions of the present invention are prepared by mixing from one part by weight of undistilled polyisocyanate with from 0.1 to 10 parts by weight of one or a mixture of the representative solvents described hereinbefore. Compositions containing more than 10 parts by weight of solvent per part of undistilled polyisocyanate are generally not economically attractive. For many applications, mixtures containing about equal parts of undistilled polyisocyanate and solvent are particularly useful. Naturally, the ratio of polyisocyanate to solvent preferred for any given application is determined by a variety of factors. In the case of coating or impregnating a substrate, for example, these factors include the particular polyisocyanate and solvent being employed, the amount of polyurea to be formed per unit area or volume of substrate and the method of applying the composition to the substrate.

The compositions of the present invention may contain minor amounts of additives of the type normally employed in coating and adhesive formulations. Preferably, such additives should not react with the polyisocyanate portion of the compositions. Antioxidants, pigments, fillers, resins, and plasticizers, for example, may be added to advantage for certain applications. When the compositions are used, these additional materials are incorporated into the polyureas produced. Particularly useful products may be formed by including compatible plasticizers, resins, and polymers. Solvents other than those specified in the definition may be added to the compositions of this invention to serve as diluents or thinners. Such solvents should be inert toward isocyanato groups and preferably be more volatile than the solvent contained in the composition. Halogenated hydrocarbons, especially those containing fluorine, are useful diluents.

In order to make use of the compositions of the present invention, it is only necessary to contact a polyisocyanate/solvent mixture with water, whereupon resinous polyurea is formed. If the solvent employed is volatile under the conditions of polyurea formation, the resinous polyurea will be deposited as a film on any surface, exterior or interior, originally wetted by the polyisocyanate/solvent mixture. If the solvent used is not allowed to volatize under the conditions of polyurea formation, resinous polyurea will still be formed. Under these latter conditions, the polyurea often separates from the solvent and is deposited on any surface originally wetted by the polyisocyanate/solvent mixture. However, certain solvents having a low vapor pressure, such as the dimethyl amides of higher carboxylic acids, may serve as plasticizers for the polyureas and yield a uniform resinous product essentially equivalent in mass to the polyisocyanate/solvent mixture initially applied. These plasticized polyureas possess properties which are particularly valuable in certain applications as will be pointed out hereinafter.

Usually, the compositions of this invention are used by coating and/or impregnating a substrate with the polyisocyanate/solvent mixture. Polyurea formation then takes place as a result of contact with water which may already be contained in the substrate or with water supplied by moisture in the atmosphere. Water may also be added directly to the compositions of this invention applied as a coating to yield polyureas. With preferred solvents such as dimethylformamide, polyurea formation is accompanied by evaporation of the solvent into the surrounding atmosphere. The rate at which a given solvent evaporates obviously has an effect on the nature of the polyurea formed. If solvent appears to evaporate too rapidly, a less volatile solvent may be used or polyurea formation can be accomplished at a lower temperature or in an atmosphere essentially saturated with solvent vapors. Conversely, if solvent loss appears to be too slow, more volatile solvents, higher temperatures or forced air circulation may be of value.

The rate of polyurea formation may be varied within limits by controlling the rate and quantity of water supplied to the polyisocyanate/solvent mixture. This may involve controlling the moisture content of the substrate or the humidity of the atmosphere in which the application is performed.

Temperature also influences the rate of polyurea formation in the usual manner. As a rule, ambient temperatures and humidities permit polyurea formation to proceed at acceptable rates. The rate of polyurea formation is affected by the solvent contained in the polyisocyanate/solvent composition, for as pointed out hereinbefore, the solvents used in these compositions appear to catalyze the isocyanato-water reaction. Low molecular weight alkylated amides, ureas, and sulfoxides provide for rapid polyurea formation. In general the rate of polyurea formation is not as great in other solvents. When it is desirable to increase the rate for a given solvent system, tertiary amine and organo metallic catalysts may be employed. These catalysts are well known to those acquainted with isocyanate reactions.

Since the compositions of the present invention are liquids having relatively low viscosities, application may be performed in a variety of conventional ways. These include spraying, brushing, padding, wiping, roll coating, and dipping, for example. The exact manner of applying the compositions of this invention and forming valuable polyureas therefrom will be clarified by the following description of some actual uses. The uses disclosed are not meant to serve as a restriction of any kind.

The low molecular weight and low viscosity of the compositions make them ideal for use as impregnants, saturants, or sealers for porous substances of many types. Where flexible substrates are involved, the in situ formation of the resinous polyureas confers strength and rigidity. In the cause of moisture sensitive substrates, the presence of the polyureas improves mechanical properties in the presence of moisture. These types of improvements in properties make the compositions of the present invention particularly valuable for treating substantially cellulosic fibrous material formable or formed into a web-shape, most commonly paper, paper or fiber board, and related materials. Liner board containing 1 to 5% of polyurea formed in situ shows much improved tensile strength, burst resistance and compressive strength under both wet and dry conditions. Formation of the polyurea may be accomplished by applying the compositions of the present invention to essentially finished paper by spraying, dipping, or roll coating, for example, and allowing the polyureas to be formed by contact with moisture contained in the paper or surrounding atmosphere. Solvent removal may be accomplished by evaporation to produce a finished product. Solvent removal by extraction with water may also be used once the polyurea has been formed. The treatment may be used in combination with other paper additives such urea-formaldehyde resins, elastomer latices and rosins.

Particularly novel paper-polyurea structures are produced by compositions of this invention prepared with solvents of low volatility such as the di-lower alkyl amides of $C_8$ to $C_{18}$ long chain aliphatic carboxylic acids, particularly the dimethyl amides of mixed $C_8$ to $C_{10}$ acids. These amides remain in the polyurea or plasticizers. In contrast to the hydrophobic treated papers discussed in the preceding paragraph, papers treated with these compositions are hydrophilic and yet show improved wet tensile and burst properties. These properties suggest the use of the higher amide/polyurea mixture in a variety of paper products for cosmetic or sanitary purposes.

In addition to applications to paper, the compositions of this invention may be used for stiffening, reinforcing, water-proofing, or modifying a variety of fabrics and specialty papers derived from natural and synthetic fibers such as asbestos, cotton, flax, nylon, poly(ethylene terephthalate) and polyacrylonitrile. The compositions may be used to penetrate and seal wood. This treatment is of particular value with soft, highly porous woods where incorporation of the polyurea improves resistance to moisture and surface marring and may upgrade mechanical properties. Application as a wood penetrant and sealer is best accomplished by dipping and applying pressure to force the polyisocyanate/solvent composition into the wood. The compositions of this invention are also useful for sealing the surface of porous masonry such as concrete, mortar, plaster, amesite, stone and brick. The compositions also may be used for sealing porous sub-surface formations in connection with underground storage of hydrocarbons, oil well drilling and related activities.

The compositions of this invention find use in coating many substrates about as varied in nature as those described in the preceding paragraph. It should be pointed out that in many applications where the compositions are used for coating that more or less impregnation may occur simultaneously depending on the composition and means of application and the porosity of the substrate involved. The compositions are especially useful for coating wood. With dimethylformamide/polyisocyanate mixtures, the coating formed by spraying or brushing sets to a tack-free state in about 3 to 6 minutes under usual conditions of humidity and temperature. The coating is tough, abrasion- and crack-resistant and adheres so tightly that removal results in the pulling away of the wood fibers in contact with the coating film. Similar coatings may be applied to a variety of surfaces of limited porosity such as sized paper, finished leather and sealed concrete. In the case of metals, coatings formed from polyisocyanate/solvent compositions containing lower amides exhibit little adhesion if the metal is not first primed. This limited adhesion permits these particular coatings to be used as strippable protective metal coatings. Coatings derived from compositions containing higher amides on the other hand adhere well to metals.

Another major field of applications comprises adhesive or binder uses. Because of the speed with which the compositions of this invention may form cured polyureas in situ, they are useful for binding wood chips, ground leather, ground cork and similar substances into sheet or molded forms. They are also very useful as adhesives for laminating thin sheets such as wood, paper and cloth into plywood-like products. The strength of the polyureas suggests their use in producing structural members for conventional purposes and specialized purposes such as those of the aerospace field. The tough resinous polyureas also bond abrasive powders firmly to paper and cloth to form useful products. Anti-skid grit may be bonded to concrete or other paving surfaces. The compositions may be used as a flocking adhesive, a binder for non-woven fabrics and for soil treatment.

The compositions of this invention form unsupported films of amorphous polyurea resins. These may be prepared by applying the polyisocyanate/solvent mixtures to a release surface, contacting with water and removing the film. The solvent may evaporate or form a part of the film depending on its volatility. Obviously these operations may be performed continuously. The films are transparent, but generally colored because of the nature of the undistilled polyisocyanate used in their preparation. They are tough and abrasion resistant. Film-forming can be used to produce castings which may or may not be reinforced depending on the contemplated use. Glass cloth is excellent for producing tough molded forms much in the manner used with epoxy and glyptal resins. The films may also be used to form laminates with a variety of substrates. For these purposes fully formed film may be adhered to the substrate by a suitable adhesive, which preferably is a composition of this invention, or partially cured film which still is tacky may be transferred to the substrate by the application of pressure. This latter procedure of transfer coating is particularly valuable when a surface coating on a highly porous substrate is desired. Application of polyisocyanate/solvent mixture would result in much impregnation or saturation with such substrates.

Under proper conditions, the compositions of this invention may be used to prepare cellular products which may be described as being similar to conventional rigid polyurethane foams. In order to promote foam formation, a surfactant of the type normally used in preparing polyurethane foams should be incorporated in the polyisocyanate/solvent mixture. Suitable surfactants include (1) non-ionics prepared by sequential addition of propylene and ethylene oxides to polyfunctional compounds such as propylene glycol, glycerin and ethylene diamine, (2) polydimethylsiloxane-polyalkyleneether block copolymer such as described in U.S. Patent 2,834,748 and (3) related siloxane-alkylene ether block copolymers lacking a C—O—Si linkage such as disclosed in Canadian Patent 669,881. Expansion of the polyurea may be brought about by the generation of carbon dioxide which is evolved spontaneously when the polyisocyanate/solvent mixture is exposed to moisture or by a combination of generated carbon dioxide and vapors of an inert, readily volatile solvent such as trichlorofluoromethane, methylene chloride and the like. Foams having densities of the order of 1 lb./cu. ft. may be produced. Foamed coatings are readily prepared by applying polyisocyanate/solvent mixture, containing surfactant, to a surface and allowing the applied film to contact moisture or a moist atmosphere.

While the uses of the compositions of this invention described hereinbefore are for the most part related to coating or impregnating, it should be noted that other types of operations are possible. For example, polyureas in granular or particulate form may be produced by exposing droplets of a polyisocyanate/solvent composition to a moist atmosphere. These polyurea particles may serve as carriers for other materials such as pesticides, herbicides, and the like. Foamed polyurea particles of this type may be used for insulation and vapor barriers on volatile liquids.

The following examples, in which parts and percents are by weight unless otherwise indicated, are illustrative of the present invention. The following polyisocyanates are employed in these examples.

*Polyisocyanate A.*—Tolylene diamine (80% 2,4-isomer; 20% 2,6-isomer) is dissolved in o-dichlorobenzene and phosgenated essentially by the procedure disclosed in U.S. Patent 2,822,373. Following the phosgenation, o-dichlorobenzene and about half of the distillable diisocyate are removed by fractional distillation. The undistilled portion of the polyisocyanate contains about 75% of volatile tolylene diisocyanates with the remainder being phosgenation by-products. The isocyanate group content of this polyisocyanate is about 37–38% by ASTM D1638–60T.

*Polyisocyanate B.*—Undistilled 4,4′ - diaminodiphenylmethane, containing about 15% polyamines, is prepared by adding 1 mole of aqueous formaldehyde to an aqueous solution of 3 moles of aniline and 2.8 moles of hydrochloric acid. The formaldehyde addition is made at about 30° C. and followed by heating at 85° C. for 3 hours. The condensation mass is neutralized with sodium hydroxide and the organic layer is separated. Unreacted aniline is removed by distillation at reduced pressure. The undistilled mixture of di- and polyamines is dissolved in o-dichlorobenzene and converted to the corresponding isocyanates by phosgenation following essentially the procedure disclosed in U.S. Patent 2,822,373. After the phosgenation, the o-dichlorobenzene is removed by fractional distillation at reduced pressure. The undistilled product contains about 72% 4,4′-diisocyanatodiphenylmethane. The rest of the mixture consists of polyisocyanates and phosgenation by-products. The product contains about 31% by weight of isocyanato groups when assayed by the procedure of ASTM D1638–60T.

*Polyisocyanate C.*—A sample of Polyisocyanate B is placed in a vacuum still and 4,4′-diisocyanatodiphenylmethane is distilled at reduced pressure. The distillation is continued until the residue in the still amounts to about half the quantity of Polyisocyanate B originally charged. The product represented by the undistilled material contains about 20% 4,4-diisocyanatodiphenylmethane. The rest of the material consists of other polyisocyanates and phosgenation by-products.

*Polyisocyanate D.*—A polyaryl polyisocyante mixture is prepared by the procedures disclosed in U.S. Patent 2,683,730. The product contains about 50% by weight 4,4′-diisocyanatodiphenylmethane. The remainder of the product consists of polyisocyanates and phosgenation by-products in such amounts that the average functionality of the entire mixture is about 3 isocyanato groups per molecule.

*Polyisocyanate E.*—A polyisocyanate is prepared by phosgenating the polyamine produced by the condensation of one mole of formaldehyde with 1.46 moles of aniline and 1.2 moles of m-tolylene diamine. Following the condensation, unreacted aniline and tolylene diamine are removed by distillation at reduced pressure prior to phosgenation in o-dichlorobenzene by the procedures of U.S. Patent 2,822,373. After distillation of solvent, the product, represented by the undistilled material, has an assay of 36.2% isocyanato groups by weight by ASTM D1638–60T.

EXAMPLE 1

Equal parts of Polyisocyanate B and N,N-dimethylformamide are placed in a dry container which is shaken to effect mixing. A portion of this mixture is poured onto a horizontal surface of poly(ethylene terephthalate). The liquid is allowed to spread freely and forms a layer of liquid about 5–7 mils in thickness. The liquid is allowed to stand at room temperature in an atmosphere having a relative humidity of about 50%. The film is dry to touch in 3 minutes and a self-supporting film of resinous polyurea is formed which is readily separated from the poly(ethylene terephthalate) surface. The film is about 3 mils in thickness. It is transparent and brown in color. Both sides of the film are glossy. It may be flexed and folded without breaking. Its tensile strength is about 7000 lbs./in.$^2$ at 30% elongation. The abrasion resistance of the film with a Tabor CS–10 wheel is 95 mg./1000 revolutions.

The chemical resistance of the film toward boiling water, 10% hydrochloric acid at 70° C., 20% sodium hydroxide at 70° C. and 5% sodium hypochlorite at 70° C. is good. The film is embrittled by 37% hydrochloric acid at 70° C. and is destroyed by 97% sulfuric acid at room temperature. Solvent swell is low in hydrocarbons and chlorinated hydrocarbons. About 20 to 30% increases in volume are observed when the film is exposed to solvents such as methyl ethyl ketone, ethyl acetate and ethanol at temperatures of 25 to 50° C. The increase in volume of the film is quite large in dimethylformamide or dimethyl sulfoxide, but solution of the film does not occur.

When film formation is attempted with Polyisocyanate B being replaced by distilled methylene bis-(4-phenylisocyanate), a white flaky product is formed which is changed to a fine powder when the flakes are rubbed between the fingers. The X-ray diffraction pattern of the powdery material indicates that this product is highly crystalline. The X-ray pattern yielded by the amorphous polyurea resin film prepared from Polyisocyanate B indicates little crystallinity, perhaps 10% of that present in the powdery product.

When Polyisocyanate B is replaced by Polyisocyanates A, C, D and E in the procedure described above, films are produced which are similar in appearance to those obtained from Polyisocyanate B. When distilled tolylene diisocyanate is used, a powdery product is obtained which is similar to that made from distilled methylene bis-(4-phenylisocyanate).

It should be noted that when Polyisocyanate B is exposed as a liquid film to the atmosphere in the absence of dimethylformamide, a brittle non-coherent material is obtained rather than a film. This experiment further demonstrates the critical nature of both components in the novel polyisocyanate/solvent compositions of this invention.

EXAMPLE 2

This example illustrates the variety of polyisocyanate/solvent combinations which may be used to form resinous polyureas. A series of 9 mixtures containing about equal parts of polyisocyanate and solvent are prepared in dry containers. The combinations of ingredients employed in each of these mixtures are given in Table I.

TABLE I

| Polyisocyanate: | Solvent |
|---|---|
| A | N,N-dimethylacetamide |
| B | N,N-dimethylacetamide |
| D | N-methyl pyrrolidone |
| A | N,N,N',N'-tetramethylurea |
| D | N,N,N',N'-tetramethylurea |
| D | N,N-di-n-butylformamide |
| D | N-formyl pyrrolidine |
| D | N-formyl morpholine |
| B | dimethyl sulfoxide |

Self-supporting films are produced from all of these combinations by the procedure described in Example 1. In each case, sufficient time is allowed for the exposed material to come to an essentially constant weight before the polyurea film is separated from the poly(ethylene terephthalate) surface.

EXAMPLE 3

About equal parts of Polyisocyanate B and a mixture of dimethylamides of $C_8$–$C_{10}$ fatty acids are blended in a dry container. Some of the mixture is drawn as a 6 mil film on a horizontal surface of poly(ethylene terephthalate) and allowed to stand 16 hours at room temperature in an atmosphere having a relative humidity of about 50%. A polyurea film is formed which is easily removed from the poly(ethylene terephthalate) surface. In this instance, the solvent has a low vapor pressure and is compatible with the polyurea with the result that the solvent remains in the polyurea as a plasticizer. The self-supporting film is more flexible and elastic than the films produced in Examples 1 and 2. By including a catalytic amount of triethylene diamine in this composition, film formation can be accomplished more rapidly.

Paper treated with the above composition shows improved wet properties when compared with untreated paper. Surprisingly, the treated paper absorbs water almost as readily as the untreated paper.

Similar results are obtained when the solvent is N,N-dimethylolamide.

The composition forms attractive coatings when applied to wood or metal. As in the case of film formation, the solvent remains in the polyurea as a plasticizer.

EXAMPLE 4

A mixture of 70 parts of Polyisocyanate A, 30 parts of dimethyl sulfoxide and 1 part of a polyurethane foam surfactant is prepared in a dry container. The foam surfactant is a polydimethylsiloxane-polyalkyleneether block copolymer made in accordance with the procedure of Example I(a) of U.S. Patent 2,834,748. A 6 mil film of this liquid mixture is formed on a horizontal surface and exposed to a 50% relative humidity atmosphere at room temperature. After about 10 minutes, a foam which reaches a maximum height of about 250 mils is formed. The cellular product has a density of about 1 lb./cu. ft.

EXAMPLE 5

Samples of kraft liner board weighing about 42 lbs./1000 sq. ft. are treated with 3 compositions prepared from Polyisocyanate A and dimethylformamide. A fourth composition is prepared by dissolving a mixture of tall oil and Polyisocyanate A in dimethylformamide. In order to control the quantity of polyisocyanate picked up by the paper, the compositions are diluted with trichlorofluoromethane. Prior to treating, the liner board is conditioned at 73° F. and 50% relative humidity. After conditioning, it contains about 6% water. The liner board samples are immersed in the compositions for 60 seconds, allowed to drain and suspended in air at 73° F. and 50% relative humidity until constant weight is reached. The increase in weight observed is assumed to represent the amount of polyurea contained in the liner board.

The composition in parts by weight of the 4 treating solutions, the percent polyurea in the liner board samples and physical properties of the treated samples are presented in Table II. For purposes of comparison, physical properties for untreated liner board are included in the table.

TABLE II.—TREATED KRAFT LINER BOARD

| Treating Solution | A | B | C | D | None |
|---|---|---|---|---|---|
| Dimethylformamide, parts | 20 | 20 | 20 | 20 | |
| Polyisocyanate A, parts | 2 | 3 | 4 | 3.2 | |
| Tall oil | | | | 0.8 | |
| Trichlorofluoromethane, parts | 80 | 80 | 80 | 80 | |
| Polyurea in paper, percent weight increase | 3.6 | 5.2 | 6.2 | 6.1 | 0 |
| Wet tensile, machine direction, lb./in | 50 | 63 | 65 | 58 | 3 |
| Dry tensile, machine direction, lb./in | 130 | 132 | 143 | 137 | 80 |
| Compression strength, Crush ring, lb./6 in.: | | | | | |
| 50% R.H., 48 hours | 80 | 101 | 112 | 103 | 47 |
| 100% R.H., 48 hours | 27 | 30 | 34 | 36 | 20 |
| Wet, 10 min | 18 | 19 | 22 | 22 | 4 |
| Burst strength: | | | | | |
| 50% R.H | 166 | 195 | 208 | 184 | 100 |
| Wet, 24 hours | 108 | 125 | 126 | 118 | 30 |

Comparisons of the properties of the treated samples with those of the control show that striking increases in wet and dry tensile and compressive strengths result from the incorporation of minor amounts of polyurea. Very significant improvements are also observed at 50% and 100% relative humidity. Wet and dry burst strengths are also improved significantly.

EXAMPLE 6

A mixture of 3 parts of Polyisocyanate A and 10 parts of dimethylformamide is prepared in a dry container. This composition is used to treat the kraft liner board described in Example 5. Application is made by rapidly drawing an 0.5 mil thick liquid film across the paper. By changing the velocity at which the film is applied, and by applying to both sides of the paper, the amount of material picked up by a unit area of paper can be varied. After application of the polyisocyanate/solvent mixture, the paper is exposed to a 73° F. atmosphere at 50% relative humidity until it reaches constant weight. The increase in weight is assumed to represent the polyurea incorporated. Mullen burst strength is determined on the treated liner board samples at 50% relative humidity and after 16 hours in water. Values for various levels of polyurea are presented in Table III. Values for untreated samples are included for comparison.

TABLE III

| Polyurea, percent | 0 | 1 | 2 | 3 | 5 |
|---|---|---|---|---|---|
| Mullen burst: | | | | | |
| Dry, 50% R.H | 90 | 160 | 180 | 190 | 200 |
| Wet, 16 hrs. in water | 30 | 90 | 100 | 110 | 130 |

The data clearly show improvements in both wet and dry strengths. It is significant that only 1 to 2% polyurea provides paper having a wet burst equivalent to the dry burst of untreated paper.

EXAMPLE 7

A mixture of equal parts of Polyisocyanate B and dimethylformamide is prepared in a dry container. When this material is painted on fir plywood and exposed to an atmosphere having a relative humidity in the range of 45 to 60%, a tough, attractive, high gloss coating is formed which dries to the touch in about 3 minutes. The coating is flexible and does not crack when the surface is dented by a rounded object. The coating has a Sward hardness of 24–36; pencil hardness, HB. It has abrasion resistance about equivalent to that of the unsupported film prepared in Example 1. Similar coatings are formed in oak flooring and redwood.

When the polyisocyanate/solvent composition is painted on concrete and allowed to dry, the surface of the concrete no longer is wetted by water. Anti-skid grit particles can be adhered to the concrete by wetting in the mixture and placing on the concrete.

By painting this mixture on sized paper and immediately sprinkling on 100 mesh Carborundum, an abrasive paper is produced in which the polyurea serves to bond the grit to the paper.

EXAMPLE 8

Samples of kraft wrapping paper are treated with organic solvent solutions of Polyisocyanate A. Three solutions using solvents within the present invention (N,N-dimethylformamide, pyrrolidone, and N-methylformamide) are compared with three solutions prepared from solvents not included in the present invention (tetrahydrofuran, chloroform and acrylonitrile). Prior to treatment, the paper is allowed to stand at room temperature and 50% relative humidity for 24 hours. The paper is then dipped in the test solutions for 10 seconds, dried at 120–150° C. for an hour and finally allowed to stand again at room temperature and 50% humidity for 24 hours. The treating solution contains up to about 8 parts of Polysiocyanate A per 100 parts of solvent. The weight increase of the dry paper samples before and after treating indicate the amount of diisocyanate picked up. After soaking in water for 3 minutes at room temperature, the treated papers are evaluated by determining their Mullen burst strength. Longer soaking does not appreciably change the burst strength. The results are tabulated below and for purposes of comparison the burst strength of untreated paper is included.

It will be noted that all of the treatment papers are improved relative to the untreated control; however, solvents included within the present invention give the best results.

| Solvent | Percent Increase in Weight of Paper | Mullen Burst on Wet Paper |
| --- | --- | --- |
| N,N-dimethylformamide | 5.4 | 25.0 |
| Pyrrolidone | 6.5 | 25.0 |
| N-methylformamide | 6.0 | 38.7 |
| Tetrahydrofuran | 5.0 | 11.1 |
| Chloroform | 4.0 | 12.8 |
| Acrylonitrile | 3.9 | 10.0 |
| Control (No treatment) | | 2.4 |

EXAMPLE 9

Films are formed from four compositions prepared from an undistilled tolylene diisocyanate and various isomer mixtures of N-ethyl-toluenesulfonamide. The diisocyanate is prepared by phosgenating tolylene diamine (80%, 2,4-isomer; 20%, 2,6-isomer) dissolved in o-dichlorobenzene following essentially the procedure disclosed in U.S. Patent No. 2,822,373. Following the phosgenation, o-dichlorobenzene is removed by fractional distillation. The undistilled material so produced is used without further processing. It contains about 85% volatile tolylene diisocyanates with the remainder being higher boiling phosgenation by-products. Two types of N-ethyl-toluenesulfonamide are used in this example. The first of these is a liquid mixture of about equal parts of o- and p-isomers of N-ethyl-toluenesulfonamide. In addition to these isomers, the mixture contains a minor amount of unalkylated tolunesulfonamide. This material is commercially available from the Monsanto Chemical Co. as "Santicizer 8." The second sulfonamide is essentially pure N-ethyl-p-toluenesulfonamide, M.P. 58° C., also available from Monsanto as "Santicizer 3." The compositions (9–A to 9–D) used in this example are prepared by mixing the ingredients tabulated below. Triethylene diamine is added as a catylst to increase the rate of curing.

| | 9–A | 9–B | 9–C | 9–D |
| --- | --- | --- | --- | --- |
| Tolylene diisocyanate, undistilled | 70 | 70 | 70 | 70 |
| N-ethyl-o,p-toluenesulfonamide | 30 | 15 | 5 | |
| N-ethyl-p-toluenesulfonamide | | 15 | 25 | 30 |
| Triethylene diamine | 0.7 | 0.7 | 0.7 | 0.7 |

Films having a wet thickness of 3 mils are drawn on plate glass and cured (1) by standing at room temperature for 24 hours and (2) by heating for 16 hours at 105° C. in an air oven. The films yield the following data when tested for hardness.

| | 9–A | 9–B | 9–C | 9–D |
| --- | --- | --- | --- | --- |
| Sward Hardness: | | | | |
| Cured 24 hr., 25° C | 16 | 10 | 4 | 2 |
| Cured 16 hr., 105° C | 20 | 12 | 8 | 4 |
| Pencil Hardness: | | | | |
| Cured 24 hr., 25° C | B | B | B | 2B |
| Cured 16 hr., 105° C | B | B | 2B | B |

As previously indicated, these examples are not intended to restrict the uses of the compositions of the present invention. They are intended only to demonstrate and to help clarify the manner in which illustrative compositions of the present invention can be employed. The use of these compositions for coating and/or impregnating any substrate is contemplated. Similar results will be obtained with undistilled polyisocyanate phosgenation products other than those exemplified in the foregoing examples, and accordingly, the invention is not limited to these specific polyisocyanates, but encompasses all those falling within the scope of the description preceding the examples.

As many widely different embodiments of this invention may be made without departing from the spirit and scope thereof, it is to be understood that this invention is not limited to the specific embodiments thereof except as defined in the appended claims.

What is claimed is:

1. A solution of (a) the undistilled phosgenation product resulting from the phosgenation of an aromatic polyamine, said product containing aromatic polyisocyanates in (b) a solvent selected from the group consisting of N-alkylated aliphatic monocarboxylic amides containing up to 25 carbon atoms, dialkyl sulfoxides containing up to 8 carbon atoms, N-alkylated sulfonamides containing up to 25 carbon atoms and tetraalkyl ureas containing up to 25 carbon atoms.

2. The solution of claim 1 wherein said phosgenation product is obtained by the phosgenation of an aromatic amine selected from (i) the mixed 2,4- and 2,6-isomer of tolylene diamine or (ii) polyamine derived from the condensation of aniline with formaldehyde.

3. The solution of claim 2 wherein from 0.1 to 10 parts of (b) is present for each part of (a).

4. The composition of claim 3 with additional solvent for said polyisocyanate to serve as a diluent for said solution.

5. The process comprising contacting the composition of claim 1 with water whereby an amorphous polyurea resin is formed.

6. The process of claim 5 wherein said solvent is evaporated during the contacting step.

References Cited by the Examiner

UNITED STATES PATENTS

| | | | |
|---|---|---|---|
| 2,597,025 | 5/1952 | Orth | 260—453 |
| 2,757,184 | 7/1956 | Pelley | 260—453 |
| 2,875,226 | 2/1959 | Bloom et al. | 260—453 |
| 2,884,361 | 4/1959 | Bloom et al. | 260—453 |
| 2,884,362 | 4/1959 | Bloom et al. | 260—453 |
| 2,884,363 | 4/1959 | Bloom et al. | 260—453 |
| 2,888,438 | 5/1959 | Katz | 260—77.5 |
| 3,253,031 | 5/1966 | Powers | 260—570 |

FOREIGN PATENTS 871,580   6/1961   Great Britain.

OTHER REFERENCES

"Polyurethanes," Dombrow, Reinhold Pub. Co., copy 1957, page 24.

LEON J. BERCOVITZ, *Primary Examiner.*

M. C. JACOBS, F. M. McKELVEY,
*Assistant Examiners.*